United States Patent Office 3,655,696
Patented Apr. 11, 1972

3,655,696
2,3-DIHYDRO-3,3-DIMETHYL-5-BENZOFURANYL
METHYLCARBAMATE
Kenneth R. Wilson, Tonawanda, and Robert M. Kennedy, Medina, N.Y., assignors to FMC Corporation, New York, N.Y.
No Drawing. Filed Feb. 6, 1970, Ser. No. 9,406
Int. Cl. C07d 5/36
U.S. Cl. 260—346.2          1 Claim

ABSTRACT OF THE DISCLOSURE

The new pesticide 2,3-dihydro-3,3-dimethyl-5-benzofuranyl methylcarbamate is described, together with its preparation, physical properties, formulation, and use to control Arthropoda and Nematoda.

BACKGROUND OF THE INVENTION

In U.S. Pats. Nos. 3,474,170 and 3,474,171, both issued Oct. 21, 1969, of common ownership herewith, there are described certain new pesticidal dihydrobenzofuranyl carbamates. We have discovered that, contrary to earlier belief, a highly specific modification of these compounds can in fact be made, with beneficial effect, to produce a new, extremely effective, broad-spectrum pesticide.

SUMMARY OF THE INVENTION

The compound of this invention, 2,3-dihydro-3,3-dimethyl-5-benzofuranyl methylcarbamate, has the general formula:

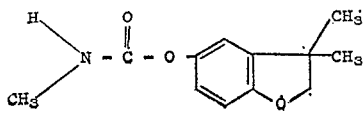

Other compounds, closely related to the above, do not have the exceptional range and effectiveness of pesticidal properties possessed by this specific structure. For example, the unsaturated analog, 3-methyl-5-benzofuranyl methylcarbamate, is virtually ineffective as an acaricide; and the compound of this invention exhibits superior acaricidal properties in comparison with the most effective of the 4- and 7-dihydrobenzofuranyl carbamates known in U.S. Pats. Nos. 3,474,170–1.

DESCRIPTION OF THE PREFERRED EMBODIMENT

The preparation and pesticidal properties of the compound of this invention are illustrated in the following specific examples, which are provided only by way of illustration and not of limitation. All temperatures are in degrees centigrade.

EXAMPLE 1

2,3-dihydro-3,3-dimethyl - 5 - benzofuranyl methylcarbamate was prepared by the following sequence of reactions:

To a chilled solution of 108.1 g. of p-benzoquinone in 500 ml. of absolute methanol was slowly added 108.9 g. of N,N-dimethyl-1-isobutenylamine, maintaining the temperature of the reaction mixture at 10–15°. The reaction mixture was then stirred at room temperature for one hour, after which the precipitated product was removed by filtration, washed with cold water, and air-dried to give 76.3 g. of 2-(dimethylamino)-2,3-dihydro-3,3-dimethylbenzofuran-5-ol; M.P. 151–154°. The identity of the product was veritfied by its infrared spectrum.

A solution of 25 g. of 2-(dimethylamino)-2,3-dihydro-3,3-dimethylbenzofuran-5-ol in 200 ml. of acetic acid was hydrogenated at room temperature under 50 p.s.i. of hydrogen pressure for 15 minutes, using 0.75 g. of platinum oxide catalyst. The catalyst was removed and the reaction mixture was concentrated under reduced pressure to give a red oil. The oil was dissolved in 250 ml. of 5% sodium bicarbonate solution, and sufficient sodium bicarbonate was added to make the solution alkaline. The alkaline solution was extracted with four 100-ml. volumes of methylene chloride, and the methylene chloride extracts were combined and washed with 200 ml. of water, dried ($Na_2SO_4$) and concentrated under reduced pressure to give 14.7 g. of solid 2-[2-(dimethylamino)-1,1-dimethylethyl] hydroquinone; M.P. 114–118°. The identity of the product was verified by its infrared spectrum.

A solution of 46.7 g. of 2-[2-(dimethylamino)-1,1-dimethylethyl]hydroquinone and 30 ml. of methyl iodide in 450 ml. of absolute ethanol was refluxed for 4 hours. The reaction mixture was cooled, and solvent was removed by evaporation under reduced pressure to give 77.3 g. of solid N-[(2,5-dihydroxyphenyl)-2,2-dimethylethyl] - N,N,N-trimethylammonium iodide; M.P. 224–226° (d). The identity of the product was verified by its infrared spectrum.

A mixture of 58.9 g. of N-[2-(2,5-dihydroxyphenyl)-2,2-dimethylethyl]-N,N,N - trimethylammonium iodide and 26.5 g. of potassium tert-butoxide in 500 ml. of tert-butanol was refluxed for about 17 hours. The solid product was removed by filtration and washed with tert-butanol, and the filtrate and wash were combined and concentrated to give additional product. The products were combined and dissolved in water, and the aqueous solution was acidified to about pH 4 with 5% hydrochloric acid. The acidified solution was extracted with three 150-ml. volumes of ether and then with two 200-ml. volumes of ether. The dried ($Na_2SO_4$) ether solutions were concentrated under reduced pressure to give 13.3 g. of 2,3-dihydro-3,3-dimethylbenzofuran-5-ol. The intermediate was characterized by thin-layer chromatography and by its infrared and nuclear magnetic resonance spectra.

To a solution of 12.9 g. of 2,3-dihydro-3,3-dimethylbenzofuran-5-ol in 75 ml. of anhydrous ether was added 0.1 g. of 1,4-diazabicyclo(2.2.2)octane. To this mixture was slowly added 6.7 g. of methyl isocyanate. The reaction mixture was stirred at room temperature for 22 hours and then refluxed for 5 hours. The mixture was chilled, and the precipitated product was collected by filtration and washed with anhydrous ether. The product was recrystallized from an ethanol/water system to give 3.5 g. of 2,3-dihydro-3,3-dimethyl-5-benzofuranyl methylcarbamate; M.P. 165.5–168° (d). The product was characterized by elemental analysis, by its infrared and nuclear magnetic resonance spectra and by thin-layer chromatography.

Analysis.—Calc'd for $C_{12}H_{15}NO_3$ (percent): C, 65.14; H, 6.84; N, 6.33. Found (percent): C, 65.39; H, 7.06; N, 6.45.

EXAMPLE 2

Insecticidal and acaricidal activity

Leaves of potted seedling Pinto bean plants were immersed in an aqueous-acetone solution of the candidate compound at a concentration of 1250 p.p.m. This solution had been prepared by dissolving 0.5 g. of toxicant in 40 ml. of acetone and then adding 360 ml. of water to give 1250 p.p.m. of toxicant. After the plant leaves had dried, they were infested with Mexican bean beetles, Southern army worms, and pea aphids. In the miticidal tests, the leaves were infested prior to immersion in the test solution. Milkweed bugs and cotton boll weevils were sprayed directly in holding containers with an aqueous-acetone solution of insecticide at 1250 p.p.m. Test plants, insects and mites were kept in a room maintained at 78–80° F. and 50% relative humidity. The dead and moribund insects were counted 48 hours after exposure to the toxicant. Results are shown in Table 1.

TABLE 1

Insecticidal and acaricidal activity

| Test species: | Percent kill at 1250 p.p.m. |
|---|---|
| Bean beetle | 100 |
| Pea aphid | 100 |
| Southern army worm | 100 |
| Milkweed bug | 100 |
| Cotton boll weevil | 100 |
| Two-spotted spider mite | 100 |

The compound 2,3-dihydro-3,3-dimethyl-5-benzofuranyl methylcarbamate exhibits effective systemic insecticidal and acaricidal activity.

EXAMPLE 3

Mite ovicidal activity

Leaves of growing Pinto bean seedlings were infested with two-spotted spider mites. Two to four hours later, when female mites had deposited eggs, adult mites were killed on plant leaves by treatment with an aqueous solution of tetraethyl pyrophosphate (TEPP) at a concentration of 936 p.p.m. of active ingredient. After an additional two to four hours, leaves were dipped in an aqueous-acetone solution of the toxicant. Twenty-four to forty-eight hours later, plant leaves were examined for adult mites which, if found, were mechanically killed, and a ring of lanolin was placed around plant stems. Seven days after plant infestation, a count of unhatched eggs and dead and living larvae was taken. Excellent ovicidal control was obtained, with some control at concentrations as low as 39 p.p.m.

EXAMPLE 4

Nematocidal activity

Nematode control was measured as follows: A nematode-infested soil was prepared by mixing about 1000 larvae of the root-knot nematode (*Meloidogyne incognita* var. *acrita*) into a liter of sandy loam soil. Into this infested soil was blended sufficient test compound, formulated as a 5% dust on attapulgite clay, to give a concentration of 25 p.p.m. This mixture was held in the greenhouse in a moist condition for 4–7 days, then young tomato plants were planted in the soil and allowed to grow for 4–6 weeks. When appropriate growth was attained, the roots of the tomato plants were washed free of soil and the degree of infestation was evaluated in comparison with plants grown in nematode-infested soil which had received no chemical treatment. The plants grown in soil treated with 2,3-dihydro-3,3-dimethyl-5-benzofuranyl methylcarbamate showed complete control of the root-knot nematode.

The compound of this invention also exhibits systemic nematocidal activity, wherein the toxicant is taken up by the leaves and translocated to the roots.

The pesticidal compound 2,3-dihydro-3,3-dimethyl-5-benzofuranyl methylcarbamate may be formulated with the usual additives and extenders used in the preparation of pesticidal compositions. The toxicant of this invention, like most pesticidal agents, is generally not applied full strength, but is incorporated with the adjuvants and carriers normally employed for facilitating the dispersion of active ingredients, recognizing the accepted fact that the formulation and mode of application of a toxicant may affect the activity of the material. This compound may be applied, for example, as a spray, dust, or granule, to the area in which pest control is desired, the choice of application varying of course with the type of pest and the environment. Thus, this compound may be formulated as granules of large particle size, as powdery dusts, as wettable powders, as emulsifiable concentrates, as solutions, and the like.

Dusts are admixtures of the active ingredients with finely divided solids such as talc, attapulgite clay, kieselguhr, pyrophyllite, chalk, diatomaceous earths, calcium phosphates, calcium and magnesium carbonates, sulfur, lime, flours, and other organic and inorganic solids which act as dispersants and carriers for the toxicant. These finely divided solids have an average particle size of less than about 50 microns. A typical dust formulation useful herein contains 10.0 parts of toxicant, 30.0 parts of bentonite clay, and 60.0 parts of talc.

The compound may be made into liquid concentrates by solution or emulsion in suitable liquids, and into solid concentrates by admixtures with talc, clays and other known solid carriers used in the pesticide art. The concentrates are compositions containing about 5–50% toxicant, and the rest inert material which includes dispersing agents, emulsifying agents, and wetting agents. The concentrates are diluted for practical application, with water or other liquid for sprays or with additional solid carrier for use as dusts. Typical carriers for solid concentrates (also called wettable powders) include fuller's earth, kaolin clays, silicas, and other highly absorbent, readily wet inorganic diluents. A solid concentrate formulation useful herein contains 1.5 parts each of sodium lignosulfonate and sodium laurylsulfonate as wetting agents, 25.0 parts of toxicant, and 72.0 parts of bentonite clay.

Useful liquid concentrates include the emulsifiable concentrates, which are homogeneous liquid or paste compositions readily dispersed in water or other dispersant, and may consist entirely of the toxicant with a liquid or solid emulsifying agent, or may also contain a liquid carrier such as xylene, heavy aromatic naphthas, isophorone and other nonvolatile organic solvents. For application, these concentrates are dispersed in water or other liquid carrier, and normally applied as a spray to the area to be treated.

Typical wetting, dispersing or emulsifying agents used in pesticidal formulations include, for example, the alkyl and alkylaryl sulfonates and sulfates and their sodium salts; alkylamide sulfonates, including fatty methyl taurides; alkylaryl polyether alcohols, sulfated higher alcohols, polyvinyl alcohols; polyethylene oxides; sulfonated animal and vegetable oils; sulfonated petroleum oils; fatty acid esters of polyhydric alcohols and the ethylene oxide addition products of such esters; and the addition products of long-chain mercaptans and ethylene oxide. Many other types of useful surface-active agents are available in commerce. The surface-active agent, when used, normally comprises from 1–15% by weight of the pesticidal composition.

Other useful formulations include simple solutions of the active ingredient in a dispersant in which it is completely soluble at the desired concentration, such as acetone or other organic solvents. Granular formulations, wherein the toxicant is carried on relatively coarse particles, are of particular utility in nematocidal applications.

The concentration of the toxicant in the dilution generally used for application is normally in the range of about 2% to about 0.001%. Many variations of spraying and dusting compositions in the art may be used, by substituting the compound of this invention into compositions known or apparent to the art.

Pesticidal compositions may be formulated and applied with other active ingredients, including other acaricides, nematocides, insecticides, fungicides, plant growth regulators, fertilizers, etc. In applying the chemicals, it is obvious that an effective amount and concentration of toxicant should be employed.

It is apparent that many modifications may be made in the structure, preparation, formulation and application of the compound of this invention, without departing from the spirit and scope of the invention and of the following claim.

We claim:
1. The compound 2,3 - dihydro - 3,3-dimethyl-5-benzofuranyl methylcarbamate.

References Cited

UNITED STATES PATENTS 3,474,110  10/1969  Scharpf _____ 260—346.2

ALEX MAZEL, Primary Examiner

B. I. DENTZ, Assistant Examiner

U.S. Cl. X.R.

260—567.6, 625; 424—285